Patented Nov. 29, 1932

1,889,251

UNITED STATES PATENT OFFICE

CARL KRAUCH AND KARL HOCHSCHWENDER, OF LUDWIGSHAFEN-ON-THE-RHINE, AND WALTER SCHUNCK, OF NEU-ROSSEN NEAR MERSEBURG, GERMANY, ASSIGNORS TO I. G. FARBENINDUSTRIE AKTIENGESELLSCHAFT, OF FRANKFORT-ON-THE-MAIN, GERMANY

PROCESS OF MANUFACTURING ORGANIC COMPOUNDS

No Drawing. Application filed May 22, 1924, Serial No. 715,191, and in Germany May 22, 1923.

In copending applications for patent a process has been described by which it is rendered possible to manufacture methanol by the catalytic reduction of carbon monoxid or dioxid by means of hydrogen or hydrocarbons at an elevated pressure and temperature and while using certain contact masses. The methanol produced is either practically pure or mixed with certain amounts of other oxygenated organic compounds.

This invention has as its object to produce substantial amounts of the said oxygenated organic compounds other than methanol which contain chiefly isobutyl alcohol, amyl and higher alcohols besides ketones, aldehydes, esters and the like. We have found that such oxygen derivatives, which are partly readily soluble in water, partly insoluble or difficultly soluble and of a more oily nature, are produced in substantial quantities, generally along with greater or less quantities of methanol, when the gas mixture composed as aforesaid of carbon monoxid or dioxid or both, which two oxids, in the claims attached to this specification are comprised by the term "oxid of carbon," and hydrogen or a gaseous hydrocarbon or both, is passed over a contact mass suitable to form methanol at otherwise similar conditions, but at a diminished speed compared with that most suitable for the formation of methanol, so that the gases are in contact with the catalyst for a greater length of time. Similarly as in the case of the manufacture of methanol, iron, nickel, or cobalt should be excluded, or practically excluded, from the contact masses as well as from the apparatus, and volatile compounds of the aforesaid metals should also be removed from the gas mixture as carefully as possible as the said metals as well as compounds thereof would give rise to methane, carbon and other undesirable products. In order to avoid the formation of such compounds within the apparatus, the latter and especially the contact vessel and other hot parts of the apparatus, should either consist of metals such as copper, silver, aluminium, or alloys thereof, for example copper manganese alloy, or of special steels containing a substantial percentage of chromium, tungsten, vanadium, or molybdenum, or iron or steel apparatus may be lined or covered inside with such metals, for example with a metal sheet, or by electroplating or any other process. Those of the contact masses which are suitable for the formation of methanol are especially apt to effect the production of other oxygenated organic compounds which contain substantial amounts of metallic oxids non-reducible under the conditions of working, and especially such contact masses as contain alkali metal or more particularly potassium compounds may be used for this special purpose. Likewise, contact masses allowing the use of relatively high temperatures are very suitable for the production of oily products. As to the composition of the gas mixture, it is of minor importance, as gas mixtures containing an excess of hydrogen over the quantity calculated for the production of methanol may be used just as well as gas mixtures containing exactly the calculated quantities of hydrogen and carbon oxid or even an excess of the latter. The temperature may be varied within rather wide limits, but in order to obtain the best results it is preferably maintained between 350 and 500° C.

In order to illustrate our invention more fully, the following examples are given, but we do not wish to limit our invention to these examples.

Example 1

A vessel capable of resisting high pressure and lined inside with copper, is supplied with 30 kilogrammes of a contact mass prepared by entering zinc oxid into fused potassium bichromate and subsequently reducing by means of hydrogen at about 450 degrees centigrade. A gas mixture composed of between 15 and 20 per cent, by volume, of carbon monoxid and about 75 per cent of hydrogen and besides containing a little nitrogen, carbon dioxid and methane, is then passed through the contact vessel at a pressure of 200 atmospheres and a temperature of about 480 degrees centigrade and with a speed of between 20 and 30 cubic metres per hour (calculated on the volume of the gas at ordinary room conditions). When the reaction gases are passed through a refrigerated receiver, without releasing the pressure, a liquid is thereby separated out containing, besides certain amounts of methanol, substantial quantities of compounds of an oily nature, chiefly higher alcohols, also aldehydes and amines and small quantities of liquid hydrocarbons and varying amounts of water, the oily products remaining generally dissolved in the methanol, especially in case only a small quantity of water is formed. The mixture may be worked up in any suitable way and may be separated into several constituents.

The most suitable velocity of the gas mixtures to give the best output of the oily products depends on the nature of the catalyst used in each special case, of the temperature and the composition of the gas mixture and the pressure employed and other conditions of working, and must be ascertained by preliminary test experiments in each single case.

Example 2

A contact mass is prepared by intimately mixing 10 parts, by weight, of chromium trioxid, 8 parts, by weight, of zinc oxid and 8 parts of baryta, and a gas mixture containing between 25 and 30 per cent of carbon monoxid and between 75 and 70 per cent, by volume, of hydrogen is passed over it at a pressure of 180 atmospheres and between 450 and 500 degrees centigrade. When 700 grammes of the contact mass aforementioned are used, the speed of the gas mixture should be between 1 and 1½ cubic meters per hour calculated for ordinary room conditions. The liquid collected in the receiver when freed from methanol by fractional distillation consists of an oil containing about 80 per cent of compounds which are insoluble or difficultly soluble in water and chiefly consist of higher alcohols.

Example 3

By passing a gas mixture such as employed in the foregoing example, through 100 grammes of a contact mass prepared from 5 parts, by weight, of tungstic oxid, 2 parts of copper oxid and 3 parts of lead oxid (litharge), at 480 degrees centigrade and at about 200 atmospheres and with a speed of 300 litres per hour (calculated for a gas reduced to ordinary room conditions) a substantial quantity of higher alcohols of an oily character and other oily compounds are produced besides methanol. Should, however, the speed of the gas mixture be 5000 litres per hour, the result would be practically pure methanol.

Example 4

A tube capable of resisting high pressure and lined with an inner tube of copper manganese alloy (with about 5 per cent manganese) is supplied with a contact mass prepared from 25 parts, by weight, of ammonium bichromate, 16 parts, by weight, of zinc oxid and 28 parts of potassium carbonate, care being taken that the mass is practically free from iron compounds. The contact mass is preferably heated to about 450 or 500 degrees centigrade before it is filled into the contact tube. Whereupon through the latter a mixture of carbon monoxid and hydrogen containing between 50 and 60 per cent of carbon monoxid is passed at a pressure of 180 atmospheres and between 450 and 500 degrees centigrade with a speed of 2.4 cubic meters (calculated on gas at ordinary room conditions for each kilogramme of contact mass contained in the contact vessel. The oily product collected in the receiver contains about 60 per cent compounds insoluble in water and chiefly consisting of higher alcohols.

What we claim is:

1. The process of manufacturing oxygenated organic compounds of a higher order than methanol which comprises passing a mixture of an oxid of carbon and a gas containing hydrogen at an elevated pressure and temperature over a contact mass capable of reacting with the said gas mixture to form methanol at a velocity so much less than that required to give substantially pure methanol, that substantially all the methanol formed is converted into higher oxygenated organic compounds.

2. The process of manufacturing oxygenated organic compounds of a higher order than methanol which comprises passing a mixture of an oxid of carbon and a gas containing hydrogen at an elevated pressure and temperature, while practically completely excluding iron, nickel and cobalt and volatile compounds thereof, over a contact mass capable of reacting with the said gas mixture to form methanol at a velocity so much less than that required to give substantially pure methanol that substantially all the methanol formed is converted into higher oxygenated organic compounds.

3. The process of manufacturing oxygenated organic compounds of a higher order than methanol which comprises passing a mixture of an oxid of carbon and a gas containing hydrogen at an elevated pressure and temperature over a contact mass capable of reacting with the said gas mixture to form methanol and containing an alkali metal at a velocity so much less than that required to give substantially pure methanol that substantially all the methanol formed is converted into higher oxygenated organic compounds.

4. The process of manufacturing oxygenated organic compounds of a higher order than methanol which comprises passing a mixture of an oxid of carbon and a gas containing hydrogen at an elevated pressure and temperature, while practically completely excluding iron, nickel and cobalt and volatile compounds thereof from the reaction, over a contact mass capable of reacting with the said gas mixture to form methanol and containing substantial amounts of a non-reducible metallic oxid at a velocity so much less than that required to give substantially pure methanol that substantially all the methanol formed is converted into higher oxygenated organic compounds.

5. The process of manufacturing oxygenated organic compounds of a higher order than methanol which comprises passing a mixture of an oxid of carbon and a gas containing hydrogen at an elevated pressure and at a temperature of between about 350 and 500° C., while practically completely excluding iron, nickel and cobalt and volatile compounds thereof from the reaction, over a contact mass capable of reacting with the said gas mixture to form methanol and containing substantial amounts of a non-reducible metallic oxid at a velocity so much less than that required to give substantially pure methanol that substantially all the methanol formed is converted into higher oxygenated organic compounds.

6. The process of manufacturing oxygenated organic compounds of a higher order than methanol which comprises passing a mixture of an oxid of carbon and a gas containing hydrogen at an elevated pressure and temperature, while practically completely excluding iron, nickel and cobalt and volatile compounds thereof from the reaction, over a contact mass capable of reacting with the said gas mixture to form methanol, and containing an alkali metal, at a velocity so much less than that required to give substantially pure methanol that substantially all the methanol formed is converted into higher oxygenated organic compounds.

7. The process of manufacturing oxygenated organic compounds of a higher order than methanol which comprises passing a mixture of an oxid of carbon and a gas containing hydrogen at an elevated pressure and temperature, while practically completely excluding iron, nickel and cobalt and volatile compounds thereof from the reaction, over a contact mass capable of reacting with the said gas mixture to form methanol, and containing a compound of potassium, at a velocity so much less than that required to give substantially pure methanol that substantially all the methanol formed is converted into higher oxygenated organic compounds.

8. The process of manufacturing organic compounds of a higher order than methanol which comprises passing a mixture of an oxid of carbon and a gas containing hydrogen at an elevated pressure and temperature, while practically completely excluding iron, nickel and cobalt and volatile compounds thereof from the reaction, over a contact mass capable of reacting with the said gas mixture to form methanol and containing a heavy metal compound and an alkali metal compound, at a velocity so much less than that required to give substantially pure methanol that substantially all the methanol formed is converted into higher oxygenated organic compounds.

9. The process of manufacturing organic compounds of a higher order than methanol which comprises passing a mixture of an oxid of carbon and a gas containing hydrogen at an elevated pressure and temperature, while practically completely excluding iron, nickel and cobalt and volatile compounds thereof from the reaction, over a contact mass capable of reacting with the said gas mixture to form methanol and containing a heavy metal compound and a compound of potassium, at a velocity so much less than that required to give substantially pure methanol that substantially all the methanol formed is converted into higher oxygenated organic compounds.

10. The process of manufacturing organic compounds of a higher order than methanol which comprises passing a mixture of an oxid of carbon and a gas containing hydrogen at an elevated pressure and temperature, while practically completely excluding iron, nickel and cobalt and volatile compounds thereof from the reaction over a contact mass containing an oxid of a heavy metal and a compound of potassium, at a velocity so much less than that required to give substantially pure methanol that substantially all the methanol formed is converted into higher oxygenated organic compounds.

In testimony whereof we hereunto affix our signatures.

CARL KRAUCH.
KARL HOCHSCHWENDER.
WALTER SCHUNCK.